United States Patent
Haramaty et al.

(10) Patent No.: US 9,014,006 B2
(45) Date of Patent: Apr. 21, 2015

(54) ADAPTIVE ROUTING USING INTER-SWITCH NOTIFICATIONS

(71) Applicant: Mellanox Technologies Ltd., Yokneam (IL)

(72) Inventors: Zachy Haramaty, Hemed (IL); Eitan Zahavi, Zichron Yaakov (IL); Freddy Gabbay, Givataim (IL); Diego Crupnicoff, Buenos Aires (AR); Amiad Marelli, Tel Aviv (IL); Gil Bloch, Zichron Yaakov (IL)

(73) Assignee: Mellanox Technologies Ltd., Yokneam (IL)

( * ) Notice: Subject to any disclaimer, the term of this patent is extended or adjusted under 35 U.S.C. 154(b) by 267 days.

(21) Appl. No.: 13/754,921

(22) Filed: Jan. 31, 2013

(65) Prior Publication Data

US 2014/0211631 A1 Jul. 31, 2014

(51) Int. Cl.
*H04L 12/26* (2006.01)
*H04L 12/803* (2013.01)

(52) U.S. Cl.
CPC .................................. *H04L 47/122* (2013.01)

(58) Field of Classification Search
None
See application file for complete search history.

(56) References Cited

U.S. PATENT DOCUMENTS

| | | | |
|---|---|---|---|
| 6,480,500 B1 | 11/2002 | Erimli et al. | |
| 6,532,211 B1 | 3/2003 | Rathonyi et al. | |
| 6,775,268 B1 | 8/2004 | Wang et al. | |
| 6,804,532 B1 | 10/2004 | Moon et al. | |
| 6,912,604 B1 | 6/2005 | Tzeng et al. | |
| 7,076,569 B1 | 7/2006 | Bailey et al. | |
| 7,286,535 B2 | 10/2007 | Ishikawa et al. | |
| 7,676,597 B2 | 3/2010 | Kagan et al. | |
| 7,746,854 B2 | 6/2010 | Ambe et al. | |
| 8,489,718 B1 | 7/2013 | Brar et al. | |
| 2002/0165897 A1 | 11/2002 | Kagan et al. | |
| 2003/0065856 A1 | 4/2003 | Kagan et al. | |
| 2003/0079005 A1 | 4/2003 | Myers et al. | |
| 2003/0223453 A1 | 12/2003 | Stoler et al. | |
| 2004/0111651 A1 * | 6/2004 | Mukherjee et al. | 714/4 |
| 2005/0013245 A1 * | 1/2005 | Sreemanthula et al. | 370/229 |
| 2006/0182034 A1 | 8/2006 | Klinker et al. | |
| 2006/0291480 A1 | 12/2006 | Cho et al. | |
| 2007/0058536 A1 | 3/2007 | Vaananen et al. | |
| 2007/0237083 A9 * | 10/2007 | Oh et al. | 370/235 |
| 2008/0189432 A1 | 8/2008 | Abali et al. | |
| 2009/0119565 A1 | 5/2009 | Park et al. | |

(Continued)

OTHER PUBLICATIONS

U.S. Appl. No. 13/114,071 Office Action dated May 21, 2014.

(Continued)

*Primary Examiner* — Chirag Shah
*Assistant Examiner* — Amar Persaud
(74) *Attorney, Agent, or Firm* — D. Kligler I.P. Services Ltd

(57) ABSTRACT

A method includes receiving in a network switch of a communication network communication traffic that originates from a source node and arrives over a route through the communication network traversing one or more preceding network switches, for forwarding to a destination node. In response to detecting in the network switch a compromised ability to forward the communication traffic to the destination node, a notification is sent to the preceding network switches. The notification is to be consumed by the preceding network switches and requests the preceding network switches to modify the route so as not to traverse the network switch.

29 Claims, 4 Drawing Sheets

(56) References Cited

U.S. PATENT DOCUMENTS

| | | | |
|---|---|---|---|
| 2010/0039959 | A1 | 2/2010 | Gilmartin |
| 2010/0284404 | A1 | 11/2010 | Gopinath et al. |
| 2010/0315958 | A1 | 12/2010 | Luo et al. |
| 2011/0085449 | A1 | 4/2011 | Jeyachandran et al. |
| 2011/0096668 | A1 | 4/2011 | Bloch et al. |
| 2011/0164496 | A1* | 7/2011 | Loh et al. ............... 370/230 |
| 2012/0082057 | A1* | 4/2012 | Welin et al. ............. 370/252 |
| 2012/0300669 | A1 | 11/2012 | Zahavi |
| 2012/0314706 | A1 | 12/2012 | Liss |
| 2013/0114599 | A1 | 5/2013 | Arad |
| 2013/0242745 | A1* | 9/2013 | Umezuki ............... 370/236 |
| 2013/0336116 | A1* | 12/2013 | Vasseur et al. ......... 370/235 |

OTHER PUBLICATIONS

Leiserson, C E., "Fat-Trees: Universal Networks for Hardware Efficient Supercomputing", IEEE Transactions on Computers, vol. C-34, No. 10, pp. 892-901, Oct. 1985.

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.

Matsuoka S., "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, Jun. 21-25, 2008.

Jiang et al., "Indirect Adaptive Routing on Large Scale Interconnection Networks", 36th International Symposium on Computer Architecture, pp. 220-231, Austin, USA, Jun. 20-24, 2009.

Minkenberg et al., "Adaptive Routing in Data Center Bridges", Proceedings of 17th IEEE Symposium on High Performance Interconnects, New York, USA, pp. 33-41, Aug. 25-27, 2009.

Kim et al., "Adaptive Routing in High-Radix Clos Network", Proceedings of the 2006 ACM/IEEE Conference on Supercomputing (SC2006), Tampa, USA, Nov. 2006.

Infiniband Trade Association, "InfiniBandTM Architecture Specification vol. 1", Release 1.2.1, Nov. 2007.

Culley et al., "Marker PDU Aligned Framing for TCP Specification", IETF Network Working Group, RFC 5044, Oct. 2007.

Shah et al., "Direct Data Placement over Reliable Transports", IETF Network Working Group, RFC 5041, Oct. 2007.

Kagan et al, U.S. Appl. No. 13/481,890, filed May 28, 2012.

U.S. Appl. No. 12/910,900 Office Action dated Apr. 9, 2013.

Gusat et al., "R3C2: Reactive Route & Rate Control for CEE", Proceedings of 18th IEEE Symposium on High Performance Interconnects, New York, USA, pp. 50-57, Aug. 10-27, 2010.

Wu et al., "DARD: Distributed adaptive routing datacenter networks", Proceedings of IEEE 32nd International Conference Distributed Computing Systems, pp. 32-41, Jun. 18-21, 2012.

Ding et al., "Level-wise scheduling algorithm for fat tree interconnection networks", Proceedings of the 2006 ACM/IEEE Conference on Supercomputing (SC 2006), 9 pages, Nov. 2006.

Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.

Martinez et al., "Supporting fully adaptive routing in Infiniband networks", Proceedings of the International Parallel and Distributed Processing Symposium (IPDPS'03), Nice, France, 10 pages, Apr. 22-26, 2003.

\* cited by examiner

ADAPTIVE ROUTING USING INTER-SWITCH NOTIFICATIONS

FIELD OF THE INVENTION

The present invention relates generally to communication networks, and particularly to methods and systems for adaptive routing.

BACKGROUND OF THE INVENTION

Various techniques for routing packets through communication networks are known in the art. Some known techniques select routing paths for packets based on the network state, e.g., traffic load or congestion. Such techniques are sometimes referred to as Adaptive Routing. AR techniques are described, for example, by Kim et al., in "Adaptive Routing in High-Radix Clos Network," Proceedings of the 2006 ACM/IEEE Conference on Supercomputing (SC2006), Tampa, Fla., November 2006, which is incorporated herein by reference.

U.S. Patent Application Publication 2011/0096668, whose disclosure is incorporated herein by reference, describes a method for communication. A first packet, which belongs to a given packet flow, is routed over a first routing path through a communication network. A second packet, which follows the first packet in the given packet flow, is routed using a time-bounded Adaptive Routing (AR) mode, by evaluating a time gap between the first and second packets, routing the second packet over the first routing path if the time gap does not exceed a predefined threshold, and, if the time gap exceeds the predefined threshold, selecting a second routing path through the communication network that is potentially different from the first routing path, and routing the second packet over the second routing path.

Additional adaptive routing techniques for mitigating congestion are described by Minkenberg et al., in "Adaptive Routing in Data Center Bridges," Proceedings of the 17$^{th}$ IEEE Symposium on High Performance Interconnects, August, 2009, which is incorporated herein by reference. Adaptive routing schemes for Converged Enhanced Ethernet (CEE) are described by Gusat et al., in "R$^3$C$^2$: Reactive Route & Rate Control for CEE," Proceedings of the 18$^{th}$ IEEE Symposium on High Performance Interconnects, August, 2010, which is incorporated herein by reference.

SUMMARY OF THE INVENTION

An embodiment of the present invention that is described herein provides a method including receiving, in a network switch of a communication network, communication traffic that originates from a source node and arrives over a route through the communication network traversing one or more preceding network switches, for forwarding to a destination node. In response to detecting in the network switch a compromised ability to forward the communication traffic to the destination node, a notification is sent to the preceding network switches. The notification is to be consumed by the preceding network switches and requests the preceding network switches to modify the route so as not to traverse the network switch.

In some embodiments, detecting the compromised ability includes detecting one of a congestion on a network link leaving the network switch en-route to the destination node, a failure in the network link, and a head-of-line time-out at an input to the network link. In an embodiment, sending the notification includes forwarding the notification in accordance with a forwarding rule that depends on a topology of the communication network.

In a disclosed embodiment, detecting the compromised ability includes identifying the compromised ability with respect to a packet having a source address and a destination address, and sending the notification includes substituting the source address of the packet to serve as the destination address of the notification, and substituting the destination address of the packet to serve as the source address of the notification. In an embodiment, sending the notification includes indicating a cause of the compromised ability in the notification.

In some embodiments, the method includes receiving the notification in a preceding network switch, and modifying the route between the preceding network switch and the destination node in response to the notification. The method may include evaluating in the preceding network switch a rule, which ensures that only one of the preceding network switches modifies the route, and modifying the route only when the rule is met.

In an embodiment, when the rule is not met, the method includes forwarding the notification to another of the preceding switches. Forwarding the notification may include sending the notification using multicast. In another embodiment, forwarding the notification includes extracting a source address from the notification, caching an association between the source address and a port over which the notification was received, and, upon receiving a packet from the cached source address over a given port, forwarding the notification over the given port.

In some embodiments, the rule depends on a topology of the communication network. In an example embodiment, the communication network has a Fat-Tree (FT) topology, and evaluating the rule includes comparing a level of the preceding network switch in the FT topology to the level of the network switch that sent the notification. In another embodiment, receiving the notification includes extracting a source address from the notification, and modifying the route includes re-routing all the packets addressed to the extracted source address regardless of whether they are configured for adaptive routing.

In yet another embodiment, sending the notification includes routing the notification over an alternative route that differs from the route traversed by the communication traffic that caused the notification. In still another embodiment, sending the notification includes including in the notification a signature for checking by the preceding switches. In another embodiment, sending the notification includes preempting processing of another packet in order to give precedence to the notification. In an alternative embodiment, receiving the communication traffic includes receiving in the communication traffic an indication of a preceding network switch that could have modified the route, and sending the notification includes addressing the notification to the preceding network switch in accordance with the indication.

There is additionally provided, in accordance with an embodiment of the present invention, a network switch including multiple ports and switching circuitry. The ports are configured to communicate with a communication network. The switching circuitry is configured to receive communication traffic that originates from a source node and arrives over a route through the communication network traversing one or more preceding network switches, for forwarding to a destination node, and, in response to detecting a compromised ability to forward the communication traffic to the destination node, sending to the preceding network switches a notification, which is to be consumed by the preceding network switches and requests the preceding network switches to modify the route so as not to traverse the network switch.

There is also provided, in accordance with an embodiment of the present invention, a network switch including multiple ports and switching circuitry. The ports are configured to communicate with a communication network. The switching circuitry is configured to receive communication traffic that originates from a source node and arrives over a route through the communication network, to forward the traffic to a destination node via a downstream network switch, to receive from the downstream network switch a notification that indicates a compromised ability of the downstream network switch to forward the communication traffic to the destination node, and, in response to the notification, to modify the route so as not to traverse the downstream network switch.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for Adaptive Routing (AR) of packets. The embodiments described herein refer mainly to Infiniband® networks, but the disclosed techniques can also be used in other suitable network types.

In some embodiments, a communication network comprises multiple packet switches that are interconnected by network links. Multiple nodes, e.g., Host Channel Adapters (HCAs), use the network to exchange flows of packets with one another. Each flow originates in a certain source node, ends in a certain destination node, and travels a certain route that traverses multiple switches and links.

At some point in time, a switch along the route may detect an event that compromises its ability to forward the flow over the next link. Such an event is referred to herein as an AR event, and may comprise, for example, link-fault, congestion or head-of-line time-out. Upon detecting an AR event, the detecting switch generates a packet referred to as an AR Notification (ARN), and sends the ARN backwards along the route. The ARN typically indicates the AR event to the preceding switches on the route of the flow, and requests the preceding switches to modify the route so as not to traverse the detecting switch.

When a preceding switch receives the ARN, it typically checks whether it is in a position to modify the route, and whether the flow in question is permitted to undergo AR. If so, the switch consumes the ARN and modifies the route. Otherwise, the switch forwards the ARN to the previous switch along the route. Typically, only one of the preceding switches should modify the route and consume the ARN, in order to avoid unnecessary blocking of ports.

In some embodiments, the rules that specify how ARN packets are generated, forwarded and consumed depend on the network topology. Example rules for Fat-Tree (FT) networks are described herein. The disclosed techniques, however, are applicable to various other network topologies.

The disclosed techniques provide a highly effective alternative to local AR (rerouting packets to a different output port of the detecting switch) and to global AR (network-wide notification of the AR event and network-wide rerouting). When using the disclosed techniques, the AR event is resolved semi-locally by the switches along the route. Since the response is semi-local, AR events are resolved quickly before they escalate and become significant network bottlenecks.

Moreover, the disclosed techniques are distributed and scalable by nature, because they do not involve any central entity (e.g., a Subnet Manager (SM) in an Infiniband subnet), and do not require massive re-routing calculations such as performed, for example, by the spanning tree algorithm of IEEE 802.1Q. Furthermore, the disclosed techniques do not require extensive caching resources in the switches for caching flow information.

System Description

Figure 1:
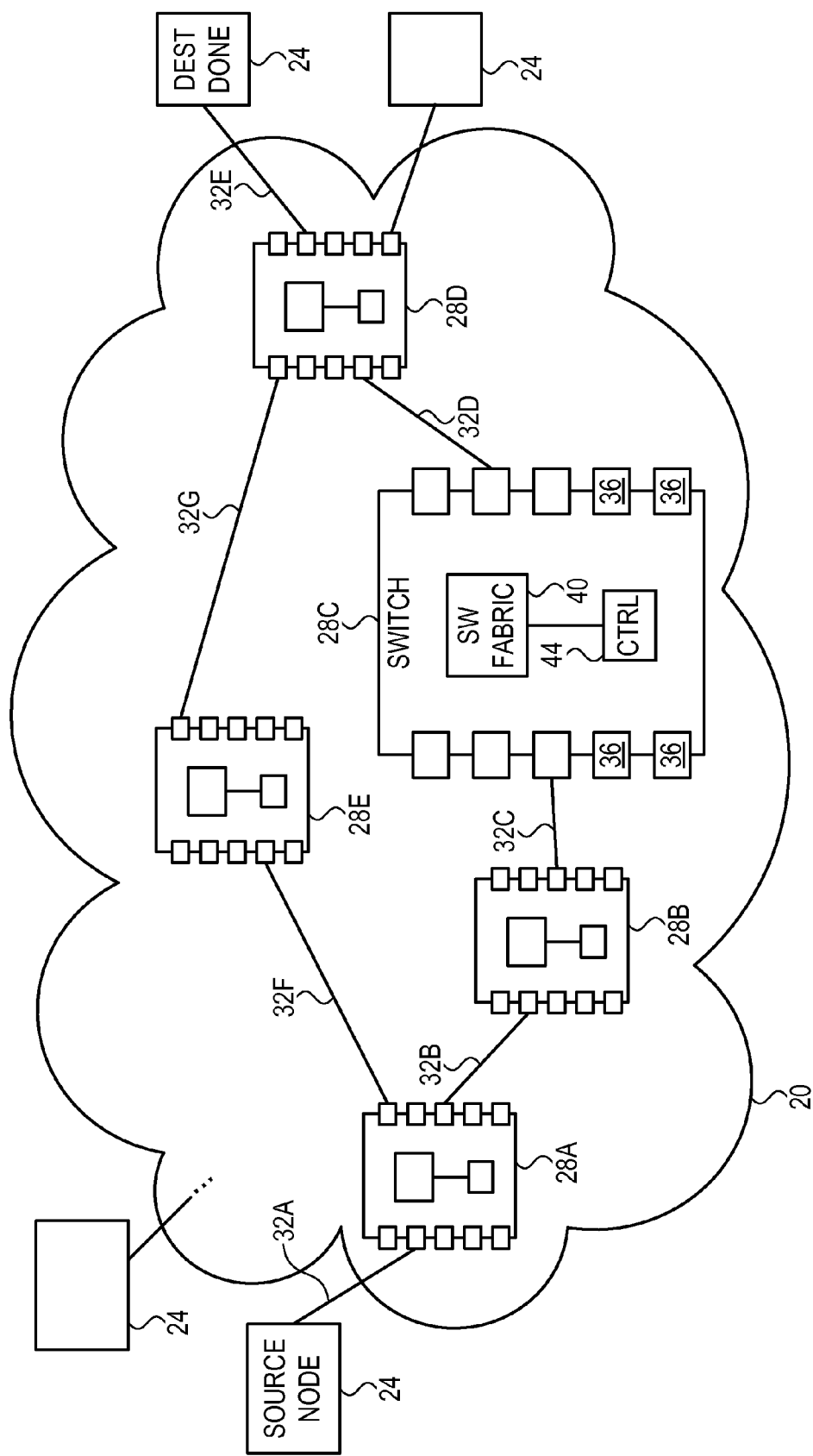
FIG. 1 is a block diagram that schematically illustrates a communication network that uses Adaptive Routing Notification (ARN), in accordance with an embodiment of the present invention.

FIG. 1 is a block diagram that schematically illustrates a communication network 20 that uses Adaptive Routing Notification (ARN), in accordance with an embodiment of the present invention. In the present example, network 20 operates in accordance with the Infiniband® specifications. In alternative embodiments, network 20 may operate in accordance with other suitable communication standards or protocols, such as variants of converged Ethernet as described in the IEEE 802.1Q standard.

Network 20 provides packet communication for multiple nodes 24. A node may comprise, for example, a Host Channel Adapter (HCA) or other Network Interface Card (NIC) of a computer. Each flow of packets originates from a certain source node and is addressed to a certain destination node. The packets of the flow are forwarded over a route through the network that traverses various switches and network links. The links are assumed bidirectional. In an Infiniband application, the switches and links belong to a certain Infiniband subnet that is managed by a Subnet Manager (SM). Without loss of generality the SM may be embodied in one of the switches, e.g., in switch 28A.

In order to demonstrate the disclosed techniques, the figure shows a simplified example of a source node, a destination node, switches 28A . . . 28E and links 32A . . . 32G. In a real-life network, the switches may be interconnected in various topologies. An example Fat-Tree (FT) topology is addressed in greater detail further below.

Each switch 28 comprises multiple ports 36 that are configured to receive and transmit packets, switch fabric 40 that is configured to forward the packets between the ports, and a control unit 44 that controls and configures the various switch elements. Among other tasks, control units 44 of the switches in network 20 carry out Adaptive Routing (AR) techniques that are described in detail below.

The description that follows refers to a certain partitioning of functions between the switch fabric and the control unit. In alternative embodiments, however, any other suitable functional partitioning can be used. In the context of the present patent application and in the claims, switch fabric 40 and control unit 44 are referred to jointly as switching circuitry that carries out the methods described herein.

The network and switch configurations shown in FIG. 1 are example configurations, which are chosen purely for the sake of conceptual clarity. In alternative embodiments, any other suitable network and/or switch configuration can be used. Certain switch elements may be implemented using hardware/firmware, such as using one or more Application-Specific Integrated Circuits (ASICs) or Field-Programmable Gate Arrays (FPGAs). Alternatively, some switch elements may be implemented in software or using a combination of hardware/firmware and software elements.

In some embodiments, certain switch functions, such as certain functions of control unit 44, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Communication Using Adaptive Routing Notifications

During real-life network operation, the route from a source node to a destination node may at some point become unsuitable or compromised in its ability to transfer packets. A scenario of this sort may be due to various events, such as congestion, link fault or head-of-line time-out. The disclosed techniques adapt the route of the packets in response to detecting such an event. Any event that triggers a change of route is thus referred to herein as an "AR event."

The term "congestion" refers to various scenarios in which the bandwidth of a port or link is insufficient for transferring the traffic volume forwarded over this port or link. The term "fault" refers to various scenarios in which a permanent or temporary equipment failure in a link or port prevents the link or port from transferring packets. The term "head-of-line time-out" refers to scenarios in which packets are delayed in the queues of a switch by more than a permitted time. The description that follows refers to link fault and link congestion for the sake of simplicity. Generally, however, fault or congestion in a link may be caused by the link itself, or by the ports or other switch elements associated with the link.

Typically, an AR event is detected by one of the switches along the route when it attempts to output packets on the designated output port. In the example scenario of FIG. 1, the route defined from the source node to the destination node traverses links 32A, 32B, 32C, 32D and 32E. The packets along this route are forwarded by switches 28A, 28B, 28C and 28D.

In this example, switch 28C detects an AR event on link 32D when attempting to forward packets over link 32D to switch 28D. The switch detecting the AR event is referred to as a detecting switch or an identifying switch. The switches along the route between the source node and the detecting switch are referred to herein as preceding switches. In the present example, switch 28 is the detecting switch and switches 28A and 28B are the preceding switches.

In the disclosed embodiments, upon detecting an AR event, the detecting switch generates a notification packet that is referred to as an Adaptive Routing Notification (ARN). The ARN typically has a unique identifier that distinguishes it from other packet types. The detecting switch sends the ARN backwards along the route to the preceding switches. The ARN notifies the preceding switches that an AR event has been detected by the detecting switch, and requests them to modify the route so as not to traverse the detecting switch.

In an embodiment, the AR event is detected with regard to a packet or multiple packets of a certain flow, having a certain source address and a destination address. The detecting switch generates the ARN with these source and destination addresses reversed. The source address is used as the destination address of the ARN, and the destination address is used as the source address of the ARN.

In addition, the ARN typically comprises parameters such as the identity of the detecting switch, the type of AR event (e.g., congestion or link fault), the source and destination address (e.g., Source Local Identifier—SLID and Destination Local Identifier—DLID) of the flow that triggered the AR event, and/or any other suitable parameters.

The ARN packet is sent backwards along the route to the preceding switches. Each preceding switch evaluates whether it can modify the route so as to circumvent the detecting switch. If a preceding switch decides it can modify the route, it does so and consumes the ARN. Otherwise, the preceding switch forwards the ARN to the previous preceding switch along the route.

Figure 2:
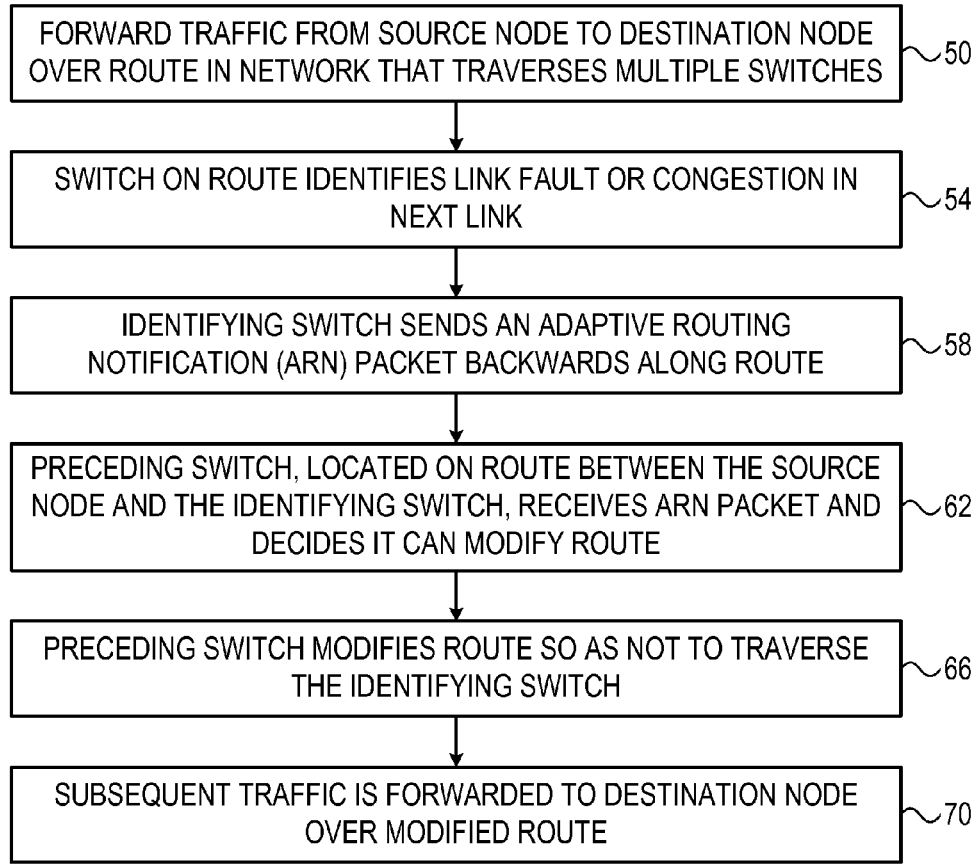
FIG. 2 is a flow chart that schematically illustrates a method for communication using ARN, in accordance with an embodiment of the present invention.

FIG. 2 is a flow chart that schematically illustrates the above-described method with reference to the example of FIG. 1, in accordance with an embodiment of the present invention. The method begins with network 20 forwarding packets of a certain flow from the source node to the destination node, at a forwarding step 50. The packets are initially forwarded over links 32A, 32B, 32C, 32D and 32E, i.e., via switches 28A, 28B, 28C and 28D.

At some point in time, switch 28C detects an AR event on link 32D, at a detection step 54. Switch 28C generates and sends an ARN backwards along the route, at a notification step 58.

One of the preceding switches identifies that it is able to modify the route so as not to traverse switch 28C, at an AR decision step 62. In the present example, switch 28B receives the ARN, but decides it cannot modify the route, and therefore forwards the ARN onwards to switch 28A.

Switch 28A receives the ARN and decides it is able to modify the route. The modified route to the destination node passes through link 32F, switch 28E, link 32G, switch 28D and link 32E. Switch 28A modifies the route so as not to traverse switch 28C, at a rerouting step 66. Subsequent traffic is forwarded via the modified route, at a subsequent communication step 70.

In some embodiments, some flows are defined in as AR-enabled, and other flows are not permitted to undergo AR. The AR definition of a flow is typically stored in the switches that process that flow. When a preceding switch receives an ARN, it first checks whether the flow in question is permitted to undergo AR. If not, the switch forwards the ARN without checking whether it can modify the route.

In an example implementation, upon receiving the ARN packet, the preceding switch performs a lookup in its forwarding table on both the destination address and the source address of the ARN. If the source address of the ARN is defined as subject to adaptive routing, then the packet will trigger changing the port number of the corresponding address. Subsequent traffic will thus be forwarded through a different route. If the source address of the ARN is not associated with an address that is subject to adaptive routing, then the preceding switch will continue forwarding the packet normally to the next link.

In an alternative embodiment, upon receiving an ARN having a certain source address (i.e., the DLID of the packet that initiated the ARN), the preceding switch re-routes all the flows addressed to this DLID regardless of whether they are configured in the switch as subject to AR or static (not subject to AR). Consider, for example, a scenario in which the flow [DLID 7, Tclass 8] is mapped statically to port 10, and the flow [DLID 7, Tclass 9] is subject to AR over ports 10 and 11. In this embodiment, if port 10 fails, the switch will map both [DLID 7, Tclass 8] and [DLID 7, Tclass 9] to port 11.

In some embodiments, the handling of congestion events differs from the handling of link-fault events. For example, when the ARN indicates that the AR event is due to link fault, the preceding switch modifies the route for all the flows that traverse the failed link. If, on the other hand, the ARN indicates that the AR event is due to congestion, the preceding switch may modify the route for only a subset of these flows, or even a single flow. In the latter case, the preceding switch may select the flows for which to modify the route using any suitable criterion. For example, the preceding switch may reroute the highest-bandwidth flows.

Another possible difference between handling of link-fault and congestion AR events is the response time involved. Congestion AR events typically require fast response, e.g., on the order of microseconds. Link-fault AR events, on the other hand, can typically tolerate longer latencies, e.g., on the order of <50 mSec. As such, congestion AR events should typically be processed using hardware or firmware, whereas link-fault AR events may be processed using software. The disclosed techniques enable considerably faster response to link-fault AR events, on the order of 1 mSec per switch or 5mSec for a series of five switches.

Figure 3:
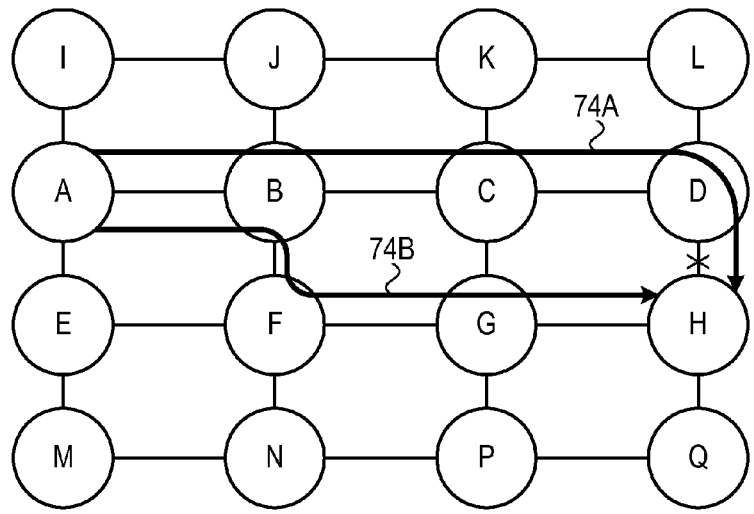
FIG. 3 is a block diagram that schematically illustrates communication using ARN in a Torus network, in accordance with an embodiment of the present invention.

FIG. 3 is a block diagram that schematically illustrates communication using ARN in a Torus network, in accordance with an embodiment of the present invention. The network of FIG. 3 comprises sixteen switches denoted A . . . Q. Consider switch B. Switch B holds an AR definition for flows having a DLID of switch H. This AR definition defies two routes—One route (denoted 74A) via the port to switch C, and another route (denoted 74B) via the port to switch F.

When the link between switches D and H on route 74A fails, switch D sends an ARN backwards toward switch A. In response to the ARN, switch B blocks the port to switch C in its AR definition, and thus cause the packets to switch H to go through switch F. Note that the backward path of the ARN may differ from the forward path of the packet that initiated the ARN.

ARN Processing in Fat-Tree Networks

In some embodiments, the rules that govern generation, forwarding and consumption of ARN packets depend on the network topology. One popular network topology is Fat-Tree (FT), which is addressed, for example, by Ding et al., in "Level-wise Scheduling Algorithm for Fat Tree Interconnection Networks," Proceedings of the 2006 ACM/IEEE Conference on Supercomputing (SC 2006), November, 2006, which is incorporated herein by reference.

Figure 4:
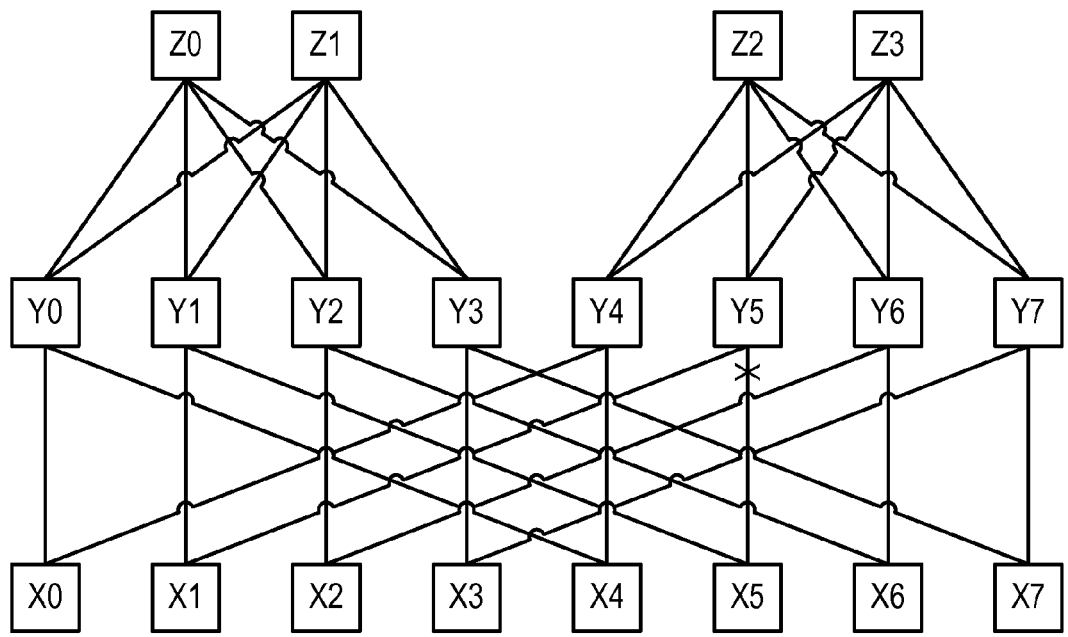
FIG. 4 is a block diagram that schematically illustrates communication using ARN in a Fat-Tree (FT) network, in accordance with an embodiment of the present invention.

FIG. 4 is a block diagram that schematically illustrates communication using ARN in a Fat-Tree (FT) network, in accordance with an embodiment of the present invention. The network of FIG. 4 comprises a total of twenty switches that are interconnected by network links in a FT configuration.

The network is arranged in three levels: Level 0 (L0) comprises switches X0 . . . X7, Level 1 (L1) comprises switches Y0 . . . Y7, and Level 2 (L2) comprises switches Z0 . . . Z3. Clients (e.g., HCAs) are connected only to the switches in L0 (X0 . . . X7). Each switch is similar to switches 28 of FIG. 1 above. A given switch may forward packets "upwards" to a higher level or "downwards" to a lower level. Except for level 2, each switch has two ports that forward packets upwards to the next higher level. One of these ports is defined as a primary port and the other is defined as a secondary port. In the present example, switch Y5 detects that the link from Y5 to X5 suffers from fault or congestion. Switch Y5 thus generates an ARN packet as explained below.

The FT configuration shown in FIG. 4 is chosen purely by way of example. In alternative embodiment, any other suitable FT configuration can be used. For example, the network may have any desired number of levels, and each switch may have more than two ports that forward packets upwards to the next higher level. Generally, however, the highest-level switches have only ports that forward packets downwards, the switches in the other levels have both upward and downward pointing ports, and only the lowest level switches connect downwards to HCAs/NICs. Paths in the network go upwards and then downwards, and are not permitted to alternate between upwards and downwards directions. Since the HCAs/NICs are connected to the lowest level, all paths start with the upward direction.

In some embodiments, the rules that define how to generate, forward and consume ARN packets are derived from the unique characteristics of the FT network. The description that follows first addresses ARN packets triggered by link-fault AR events (referred to herein as "link-fault ARN" for brevity), and then ARN packets triggered by congestion AR events (referred to herein as "congestion ARN").

Typically, link-fault ARN detected by a switch in a given level should be forwarded to all the switches in the same level, and not to the switches in other levels. Thus, the forwarding rule in each switch for a link-fault ARN in a FT network is as follows:

Forwarding upwards to higher level:
    If ARN is received from upwards port, do not forward upwards.
    Else: If the primary upward transmit port is functional, forward ARN over this port.
    Else: If the secondary upward transmit port is functional, forward ARN over this port. (Generally, upstream forwarding may be performed over any port and using any policy, including random selection. The use of primary and secondary ports is shown by way of example.)
    Else: Randomly select an upstream port.

Forwarding downwards to lower level:
    If consuming the ARN, do not forward. (The generating (detecting) switch does not consume the ARN.)
    Else: Forward the ARN using multicast to each port except the port over which the ARN was received. (For the generating (detecting) switch, the detected faulty port is regarded as the port over which the ARN was received.)

An alternate algorithm for forwarding downwards to the lower level is as follows:
    If consuming the ARN, do not forward. (The generating (detecting) switch does not consume the ARN.)
    Else: Forward the ARN to the destination address of the ARN packet where the destination address has taken the value of the original source address of the packet that has caused the generation of the ARN. (For the generating (detecting) switch, the detected faulty port is regarded as the port over which the ARN was received.)

Figure 5A:
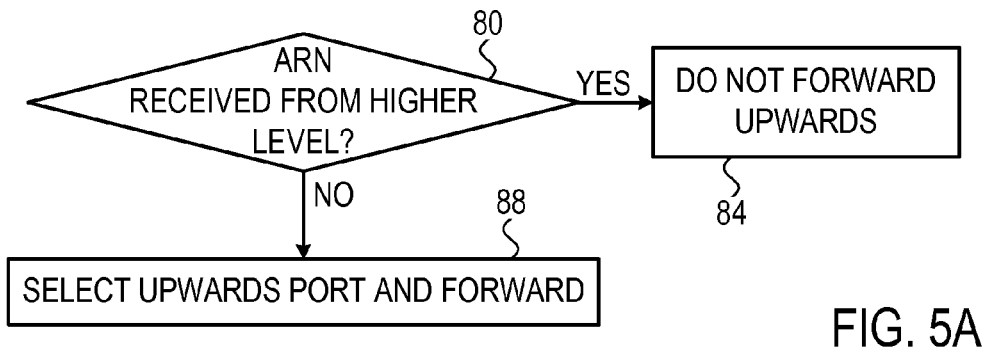
FIGS. 5A, 5B and 6 are flow charts that schematically illustrate methods for ARN forwarding, in accordance with embodiments of the present invention.
Figure 5B:
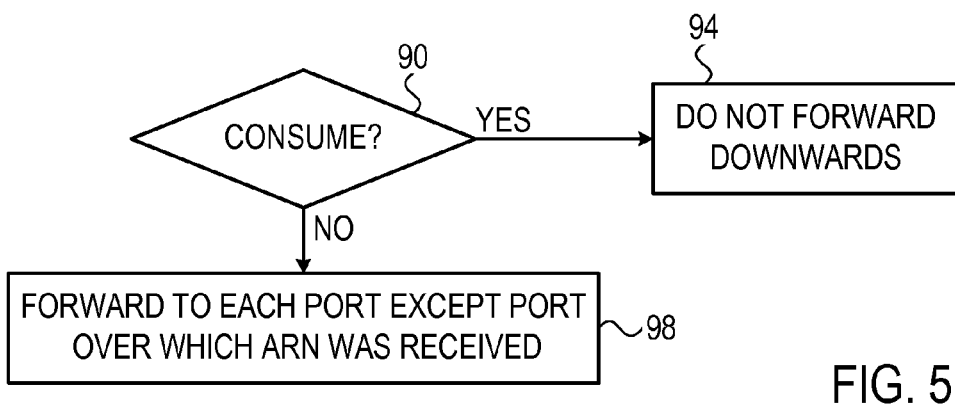

FIGS. 5A and 5B are flow charts that schematically illustrate methods for upward and downward ARN forwarding in a FT network, respectively, in accordance with an embodiment of the present invention. The method of FIG. 5A begins with a switch checking whether a received ARN was received from a higher level in the FT, at a higher-level checking step 80. If yes, the switch does not forward the ARN upwards and the method terminates at a termination step 84. If the ARN was received from a lower level, the switch selects an upward port and forwards the ARN over the selected port, at an upward forwarding step 88. As explained above, the upward port may be selected in any suitable way.

The method of FIG. 5B begins with a switch checking whether a received ARN is to be consumed by the switch, at a consumption checking step 90. If yes, the switch does not forward the ARN downwards and the method terminates at a termination step 94. If the ARN is not to be consumed, the switch forwards the ARN over all ports except the one over which the ARN arrived, at a downward forwarding step 98.

In some embodiments the ARN packets are given preemption over other packets. In such embodiments, an ARN may cause suspension of an already-outgoing packet, transmission of the ARN, and then resumption of the outgoing packet.

As explained above, only one switch along the source-destination route should consume the ARN packet and perform rerouting. Performing rerouting by more than one switch may cause unnecessary port blocking. In many cases, the individual switches do not have a full view of the topology, and therefore the decision as to which switch is to consume the ARN should be taken from the entire network perspective.

In an embodiment, the consuming switch is decided based on the level in the tree: If the level of the preceding switch is one below the level of the detecting switch, then the preceding switch consumes the ARN and performs rerouting. Otherwise, the preceding switch forwards the ARN using the forwarding rules above.

The consuming switch typically looks up the DLID of the ARN, so as to determine the port group over which rerouting may be performed. Within this port group, the switch marks the port over which the ARN was received as not allowed. Note that the look-up should be performed for static ports, as well. In an example implementation, the switch hardware holds a consume enable and forward enable flag per Receive Port (RP). The switch firmware will re-enable the port in the port group, or change back the static port, after a time period on the order of 10 mS for congestion and on the order of 30S for link fault.

In some embodiments, ARNs are forwarded using a forwarding technique that is referred to herein as "hop-by-hop ARN" or "DLID ambush." This technique is effective in coping with routes that change over time due to AR, without requiring extensive caching of all (source, destination) pairs.

Figure 6:
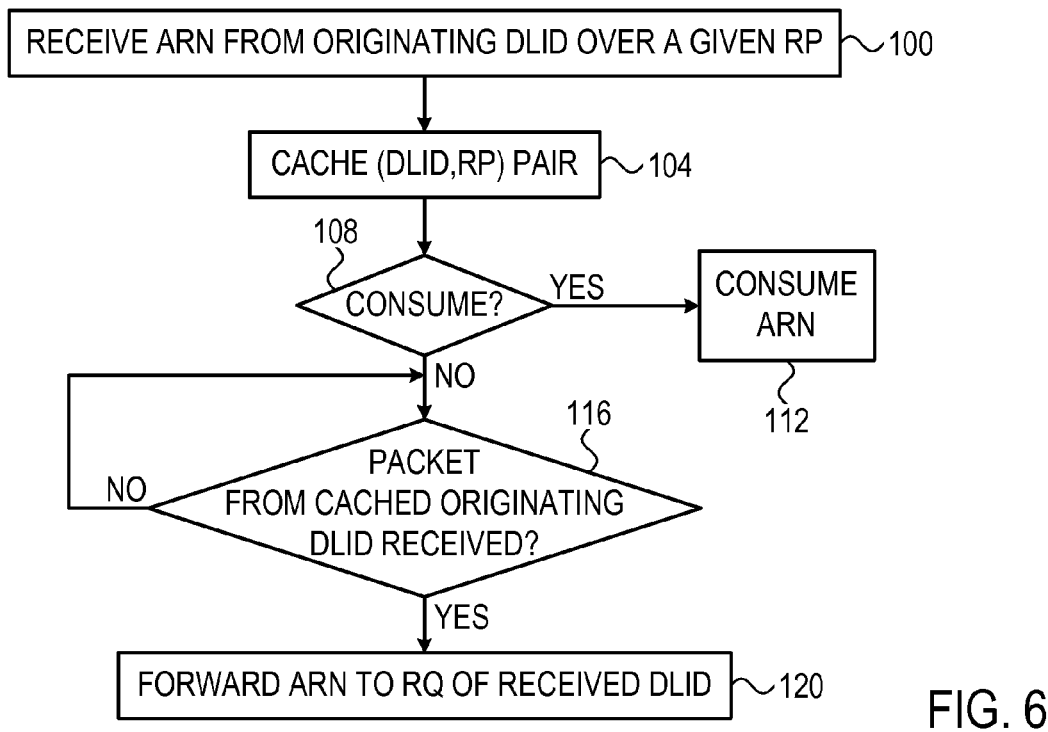

FIG. 6 is a flow chart that schematically illustrates a method for ARN forwarding using "DLID ambush," in accordance with an embodiment of the present invention. The method begins with a switch receiving an ARN from a given originating DLID over a given Receive Port (RP), at an ARN reception step 100. The switch caches the pair (originating DLID, RP), at a caching step 104. The oldest cache entry is deleted if the cache is full.

The switch checks whether it should consume the ARN, at a consumption checking step 108. If the switch is to consume the ARN, the consumption is performed as described above, at a consumption step 112. Otherwise, the ARN is not forwarded immediately upon receipt. Instead, the switch delays the forwarding until detecting that a new packet is received from an originating DLID that exists in the cache, at a packet checking step 116. When such a packet arrives, the switch forwards the ARN to the RQ of the received DLID, at a forwarding step 120. This technique ensures that only one switch in each level will receive the ARN. Note that the ARN may be forwarded over any RP, not necessarily over the original path.

The FT implementation described above is an example implementation. In alternative embodiments, the switches may use any other suitable rules for processing (e.g., generating, forwarding and/or consuming) ARN packets, derived from the network topology.

In various embodiments, the ARN packet may have different formats. In one embodiment, the ARN packet format is based on the Infiniband flow control packet format. The ARN packet may use unique op-codes to indicate the type of AR event (e.g., link-fault or congestion). Additional fields may comprise, for example, flags that request the switch to force consumption or force forwarding, service level indication for congestion ARNs, indication of the Fat-Tree level of the detecting switch, and/or any other suitable fields. Another field may comprise a general signature that can be checked using mask bits by all ARN receive switches.

In another embodiment, the ARN packet format is based on the Local Routing Header (LRH) format. In this embodiment, the ARN packet has a unique op-code such as 0xFF. The Base Transport Header (BTH) fields of the packet may comprise additional flags such as force consumption, force forwarding, indication of the Fat-Tree level of the detecting switch, and/or any other suitable field.

In some embodiments, each packet comprises a header field that indicates the identity (e.g., LID) of the last switch along the packet's route that could have taken a different routing decision with respect to the packet. As the packet travels along its route, if it traverses a subsequent switch that has multiple routing options for the packet, the subsequent switch overwrites the previous content of this field with its own LID. Thus, at any stage along its route the packet carries the LID of the last switch that could have routed the packet through a different port (although it may also maintain one or more LIDs of previous switches that have performed AR).

When such a packet reaches the detecting switch (the switch that initiates the ARN), the detecting switch extracts the LID of the last switch that could have routed the packet differently from the packet, and sends an ARN addressed specifically to that LID. This process provides a single decision as to which switch should consume the ARN and perform AR, even though reverse paths may differ from forward paths.

In an alternative embodiment, every switch along the packet's route adds its LID to the packet instead of overwriting. In this process, the detecting switch is provided with the LIDs of all preceding switches that can potentially modify the route. The detecting switch can thus choose one of these switches and address the ARN to the chosen switch. The latter process can be used, for example, in a Fat-Tree network using level-wise scheduling. Consider, for example, a four-level fat-tree network having levels from 0 (bottom) to 3 (top). Upon detecting a failure when going down to level 1, the ARN will be sent back to level 1. AR may have been performed at levels 0, 1, and 2, so the ARN should go back to the $2^{nd}$ LID.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a network switch of a communication network, receiving communication traffic that originates from a source node and arrives over a route through the communication network traversing one or more preceding network switches, for forwarding to a destination node;
   in response to detecting in the network switch a compromised ability to forward the communication traffic to the destination node, sending to the preceding network switches a notification, which is to be consumed by the preceding network switches and requests the preceding network switches to modify the route so as not to traverse the network switch;
   receiving the notification in a preceding network switch, and modifying the route between the preceding network switch and the destination node in response to the notification;
   evaluating in the preceding network switch a rule, which ensures that only one of the preceding network switches modifies the route, and modifying the route only when the rule is met; and
   when the rule is not met, forwarding the notification to another of the preceding switches,
   wherein forwarding the notification comprises extracting an address from the notification, caching an association between the address and a port over which the notification was received, and, upon receiving a packet from the cached address over a given port, forwarding the notification over the given port.

2. The method according to claim 1, wherein detecting the compromised ability comprises detecting one of a congestion on a network link leaving the network switch en-route to the destination node, a failure in the network link, and a head-of-line time-out at an input to the network link.

3. The method according to claim 1, wherein sending the notification comprises forwarding the notification in accordance with a forwarding rule that depends on a topology of the communication network.

4. The method according to claim 1, wherein detecting the compromised ability comprises identifying the compromised ability with respect to a packet having a source address and a destination address, and wherein sending the notification comprises substituting the source address of the packet to serve as the destination address of the notification, and substituting the destination address of the packet to serve as the source address of the notification.

5. The method according to claim 1, wherein sending the notification comprises indicating a cause of the compromised ability in the notification.

6. The method according to claim 1, wherein forwarding the notification comprises sending the notification using multicast.

7. The method according to claim 1, wherein the rule depends on a topology of the communication network.

8. The method according to claim 1, wherein the communication network has a Fat-Tree (FT) topology, and wherein evaluating the rule comprises comparing a level of the preceding network switch in the FT topology to the level of the network switch that sent the notification.

9. The method according to claim 1, wherein receiving the notification comprises extracting a source address from the notification, and wherein modifying the route comprises re-routing all the packets addressed to the extracted source address regardless of whether they are configured for adaptive routing.

10. The method according to claim 1, wherein sending the notification comprises routing the notification over an alternative route that differs from the route traversed by the communication traffic that caused the notification.

11. The method according to claim 1, wherein sending the notification comprises including in the notification a signature for checking by the preceding switches.

12. The method according to claim 1, wherein sending the notification comprises preempting processing of another packet in order to give precedence to the notification.

13. The method according to claim 1, wherein receiving the communication traffic comprises receiving in the communication traffic an indication of a preceding network switch that could have modified the route, and wherein sending the notification comprises addressing the notification to the preceding network switch in accordance with the indication.

14. A network switch, comprising:
   multiple ports, which are configured to communicate with a communication network; and
   switching circuitry, which is configured to receive communication traffic that originates from a source node and arrives over a route through the communication network traversing one or more preceding network switches, for forwarding to a destination node, and, in response to detecting a compromised ability to forward the communication traffic to the destination node, sending to the preceding network switches a notification, which is to be consumed by the preceding network switches and requests the preceding network switches to modify the route so as not to traverse the network switch,
   wherein the switching circuitry is configured to evaluate a rule, which ensures that only one of multiple preceding network switches between the source node and the downstream network switch will modify the route, and to modify the route only when the rule is met,
   wherein the switching circuitry is configured to forward the notification to another of the preceding switches when the rule is not met, and
   wherein the switching circuitry is configured to extract an address from the notification, to cache an association between the address and a port over which the notification was received, and, upon receiving a packet from the cached address over a given port, to forward the notification over the given port.

15. The switch according to claim 14, wherein the switching circuitry is configured to detect the compromised ability by detecting one of a congestion on a network link leaving the network switch en-route to the destination node, a failure in the network link, and a head-of-line time-out at an input to the network link.

16. The switch according to claim 14, wherein the switching circuitry is configured to detect the compromised ability with respect to a packet having a source address and a destination address, to substitute the source address of the packet to serve as the destination address of the notification, and to substitute the destination address of the packet to serve as the source address of the notification.

17. The switch according to claim 14, wherein the switching circuitry is configured to indicate a cause of the compromised ability in the notification.

18. The switch according to claim 14, wherein the switching circuitry is configured to send the notification over an alternative route that differs from the route traversed by the communication traffic that caused the notification.

19. The switch according to claim 14, wherein the switching circuitry is configured to include in the notification a signature for checking by the preceding switches.

20. The switch according to claim 14, wherein the switching circuitry is configured to preempt processing of another packet in order to give precedence to the notification.

21. The switch according to claim 14, wherein the switching circuitry is configured to receive in the communication traffic an indication of a preceding network switch that could have modified the route, and to address the notification to the preceding network switch in accordance with the indication.

22. A network switch, comprising:
multiple ports, which are configured to communicate with a communication network; and
switching circuitry, which is configured to receive communication traffic that originates from a source node and arrives over a route through the communication network, to forward the traffic to a destination node via a downstream network switch, to receive from the downstream network switch a notification that indicates a compromised ability of the downstream network switch to forward the communication traffic to the destination node, and, in response to the notification, to modify the route so as not to traverse the downstream network switch,
wherein the switching circuitry is configured to evaluate a rule, which ensures that only one of multiple preceding network switches between the source node and the downstream network switch will modify the route, and to modify the route only when the rule is met,
wherein the switching circuitry is configured to forward the notification to another of the preceding switches when the rule is not met, and
wherein the switching circuitry is configured to extract an address from the notification, to cache an association between the address and a port over which the notification was received, and, upon receiving a packet from the cached address over a given port, to forward the notification over the given port.

23. The switch according to claim 22, wherein the compromised ability is caused by one of a congestion on a network link leaving the downstream network switch en-route to the destination node, a failure in the network link, and a head-of-line time-out at an input to the network link.

24. The switch according to claim 22, wherein the switching circuitry is configured to forward the notification in accordance with a forwarding rule that depends on a topology of the communication network.

25. The switch according to claim 22, wherein the switching circuitry is configured to forward the notification using multicast.

26. The switch according to claim 22, wherein the rule depends on a topology of the communication network.

27. The switch according to claim 22, wherein the communication network has a Fat-Tree (FT) topology, and wherein the switching circuitry is configured to evaluate the rule by comparing a level of the preceding network switch in the FT topology to the level of the network switch that sent the notification.

28. The switch according to claim 22, wherein the switching circuitry is configured to extract a source address from the notification, and to re-route all the packets addressed to the extracted source address regardless of whether they are configured for adaptive routing.

29. The switch according to claim 22, wherein the switching circuitry is configured to add to the communication traffic an indication of whether the switch is capable of modifying the route.

\* \* \* \* \*